United States Patent [19]

Fabrikant et al.

[11] Patent Number: 5,558,009
[45] Date of Patent: Sep. 24, 1996

[54] DEVICE FOR COOKING OR GRILLING SMALL PIECES OF FOOD AND METHOD OF USE

[76] Inventors: Marvin Fabrikant; Patricia Fabrikant, both of 5149 Tilden St., N.W., Wash., D.C. 20016

[21] Appl. No.: 512,416

[22] Filed: Aug. 8, 1995

Related U.S. Application Data

[63] Continuation-in-part of Ser. No. 442,931, May 17, 1995.

[51] Int. Cl.⁶ ............................................. A47J 37/07
[52] U.S. Cl. ............................................. 99/450; 99/394
[58] Field of Search ........................... 99/352, 450, 355, 99/356, 394, 410, 416, 426; 220/572, 486, 489, 491, 492, 493, 759; 126/338, 9 B, 181, 155, 339

[56] References Cited

U.S. PATENT DOCUMENTS

| 306,063 | 10/1884 | Crosse | 99/394 |
|---|---|---|---|
| 1,265,627 | 5/1918 | Dickey | 99/426 |
| 2,367,448 | 1/1945 | Thiele | 99/426 |
| 2,619,951 | 12/1952 | Kahn | 99/340 |
| 2,846,941 | 8/1958 | Goodwin | 99/450 |
| 3,013,485 | 12/1961 | Leiby | 99/355 |
| 3,282,460 | 11/1966 | Boznango | 99/416 |
| 4,329,977 | 5/1982 | Orter | 99/450 |
| 4,510,855 | 4/1985 | Avner | 99/450 |
| 4,787,301 | 11/1988 | Hoatson et al. | 99/410 |
| 5,048,882 | 9/1991 | Fielding et al. | 99/394 |
| 5,050,765 | 9/1991 | Roser et al. | 220/492 |
| 5,069,196 | 12/1991 | Schlosser et al. | 126/25 |
| 5,305,686 | 4/1994 | Svensson | 99/450 |
| 5,497,697 | 3/1996 | Promny | 99/394 |

FOREIGN PATENT DOCUMENTS

| 0041391 | 1/1993 | France | 220/492 |
|---|---|---|---|

*Primary Examiner*—David Scherbel
*Assistant Examiner*—James F. Hook
*Attorney, Agent, or Firm*—Foley & Lardner

[57] ABSTRACT

A device for grilling small pieces of food is described which is a basket including a mesh. The device fits inside of conventional grills even when the lid of the grill is closed and can be easily removed for shaking and turning over of the small pieces of food without their falling out. The basket optionally has a removable lid that can be used independently of the device as a cooking surface. When the lid is in place, the entire device may be turned over. When the lid is either off or in the up position, the food inside the basket may be stirred or moved.

15 Claims, 6 Drawing Sheets

5,558,009

DEVICE FOR COOKING OR GRILLING SMALL PIECES OF FOOD AND METHOD OF USE

The present application is a continuation-in-part of application Ser. No. 08/442,931, filed on May 17, 1995.

BACKGROUND OF THE INVENTION

Various attempts have been made to develop devices for cooking or grilling specialty food items, particularly for use with outdoor barbecue grills. For example, U.S. Pat. No. 4,510,855 to Avner describes a secondary grilling apparatus which comprises a flat sheet of metal with rectangular openings which clips onto the bars of conventional barbecue grills. The sheet provides a secondary surface for grilling with smaller openings. However, the device cannot be easily taken out of the barbecue grill when hot and does not permit easy turning over of food items.

U.S. Pat. No. 5,069,196 to Schlosser et al. describes a pivoting auxiliary rack which attaches to the perimeter of a barbecue grill and can be pivoted from the side attachment over the surface of the grill or off to the side for easy retrieval of cooked food items. The pivoting rack comprises a circular flat grill with a rail around the edge to prevent food from falling off. The circular flat grill is similar to the main grill of the barbecue, but is held above the main grill by means of a pivot. The device suffers the same problems that a regular grill with longitudinal bars in that small food items easily slip through. Also, the device cannot be easily lifted out of the grill and shaken to turn over food items.

U.S. Pat. No. 2,846,941 to Goodwin discloses a barbecue basket which fully encases food items and is mounted on a spit, permitting one to easily turn cooking food items over for cooking on both sides. The device cannot be easily removed from the grill because it is mounted on a spit. Also, the device would not be suitable for small food items because the longitudinal bars create lengthwise openings through which small food items would fall out.

Other devices include the PLATINUM GRILLING WOK™ (sold by Charcoal Champion) which comprises a square bottom with trapezoidal sides that flare outward from their attachment to the square bottom. The wok contains some small circular openings to allow circulation of heated air and smoke. However, the wok contains no lid that permits shaking of food items to easily turn them over. In addition, the limited number of openings does not allow full circulation of heated air and smoke which are important for achieving optimum grilling flavor.

Still another device is the BARBECUE GRILLING GRID™ (sold by Charcoal Champion) which comprises a flat sheet with diamond-shaped openings and an upturned edge on one side. The grid cannot be easily lifted off of the grill, nor can it permit shaking of food items to turn them over without their falling out. It is essentially one-sided.

SUMMARY OF THE INVENTION

It is an object of the present invention to provide a device for cooking or grilling small food items which permits optimum circulation of heated air and smoke to achieve full grilling/cooking flavor. The device is entirely independent from the grill requiring no attachment whatsoever. It is an object of the present invention to provide a device that can be easily removed from the barbecue grill, lifted out, and shaken to turn food items over without their falling out. These same functions may be achieved while cooking with the device on the grill grate by either removing the lid or lifting the lid and stirring, shifting or moving the food items inside the device with a cooking implement (such as tongs, spatula, fork, etc.).

The use of a lid with the device is optional. With the lid on or off, spices, sauces, and flavorings may be added while cooking. Also, the grilling device of the present invention is designed to fit completely within standard barbecue grills so that the top of the grill can be closed while offering the maximum amount of cooking surface area. Still another object of the present invention is to provide a light-weight grilling device that can be easily and cheaply manufactured from a single piece of starting material.

With these objects in mind, the present inventors discovered that a grilling device could be fashioned out of light-weight stainless steel mesh having square openings, which could easily be fabricated from a single flat piece of mesh by folding and which would satisfy the above objects. Due to the flexibility of the stainless steel mesh, the device can be shaped to fit the interiors of standard barbecue grills, permitting the lid of the grill to be completely shut while providing the maximum surface area for cooking small pieces of food and maximizing the aromatic effect of barbecue cooking or grilling. Since the device is independent from the grill on which it is used, food items may be prepared and placed inside the device at one location, carried and then cooked at the grill. Once cooking is completed, the food items may be carried from the grill inside the device to another desired location.

DETAILED DESCRIPTION OF THE PREFERRED EMBODIMENTS

Figure 1:
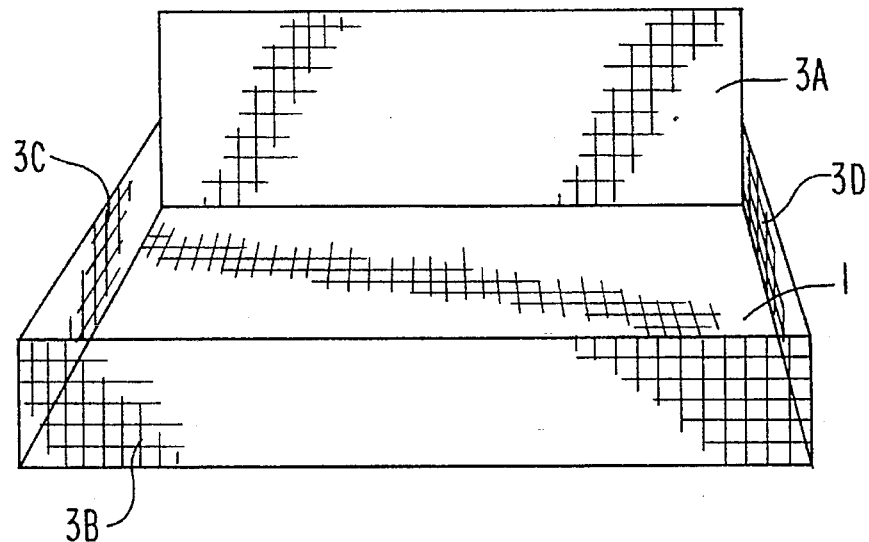
FIG. 1 shows one embodiment of the present invention without a top.

In one embodiment, the present invention is directed to a device for grilling small pieces of food, wherein the device comprises a basket composed of mesh having square openings throughout the mesh and the basket has a base that matches the shape of the grill and four side walls which are high enough to retain small pieces of food when the device is shaken to turn the small pieces of food over, wherein the mesh is made of a material suitable for cooking or grilling food that is welded, soldered, or woven. Preferably, the basket is shaped to fit within the interior of a grill when the lid of the grill is closed. Optionally, the basket of the device is covered with a lid that may be fastened to the device or placed on top of the device.

Another embodiment of the present invention is a device for grilling small pieces of food as described in the above paragraph, wherein the device comprises a fully enclosed basket having a top, a bottom, and four side walls. One of the four side walls is preferably raised higher than the other three walls, so that the top of the device slopes downward from a point where the top is joined with the raised side wall to a point where the top is joined with at least one of the other three side walls. In this embodiment, a single cut is made through the side walls of the device, separating it into two halves, which may be used separately as two grilling devices or together in one grilling device as a top and bottom. This embodiment is further advantageous because of the ease of production.

Another embodiment of the present invention is a method of using the device to grill small pieces of food on a grill comprising placing the pieces of food in the basket, placing the basket on the grill, closing the lid of the grill, removing the basket after the small pieces of food are cooked on one side, shaking the basket to turn the pieces of food over onto their uncooked sides, and placing the basket onto the grill until the small pieces of food are cooked. Optionally, the entire device may be turned upside down with the food remaining in the basket to turn the food over when a lid is in place.

Preferably, the device is used on a covered grill having a lid and the base of the device has a rectangular or circular shape which matches the dimensions of the most commonly sold outdoor barbecue grills. More preferred is a rectangular base measuring about 11 inches by about 16 inches.

The mesh can be made of any material suitable for cooking or grilling pieces of food that is welded, soldered or woven. Preferably, the mesh is stainless steel mesh or mild steel covered with a non-stick coating such as XYLON™ (manufactured by Whitford Manufacturing). The size of the square openings throughout the mesh is between 14 gauge and 19 gauge, or which measure between about 0.2 inches across to about 0.8 inches across. The most preferred size of the square openings is about 0.5 inches across.

The mesh can optionally be nickel-plated, porcelain-coated, or coated with a non-stick coating suitable for grilling or cooking.

As used herein, "small pieces of food" refers to those small pieces of food cooked on grills which normally fall through the longitudinal bars of a conventional grill grate. In particular, these small pieces of food include sliced, chopped, unchopped, chunked, and whole vegetables, fruits, scallops, shrimp, and pieces of meat or fish.

Preferably, one or more divider walls can be placed inside the basket and attached to the base to create separate areas for placing different types of small food pieces. For example, all the vegetables can be placed on one side of a divider wall and all the chopped meat pieces can be placed on the other side of the divider wall.

For convenience, only FIG. 1 contains the mesh pattern drawn on all sides. FIGS. 2–9 are in block style, showing only structural lines where edges or corners are formed. However, the devices shown in FIGS. 2–9 are also formed of the mesh material shown in FIG. 1.

FIG. 1 shows a preferred embodiment of the present invention wherein one of the four side walls 3A adjoining the cooking base 1 is raised higher than the other three side walls 3B, 3C and 3D.

Figure 2:
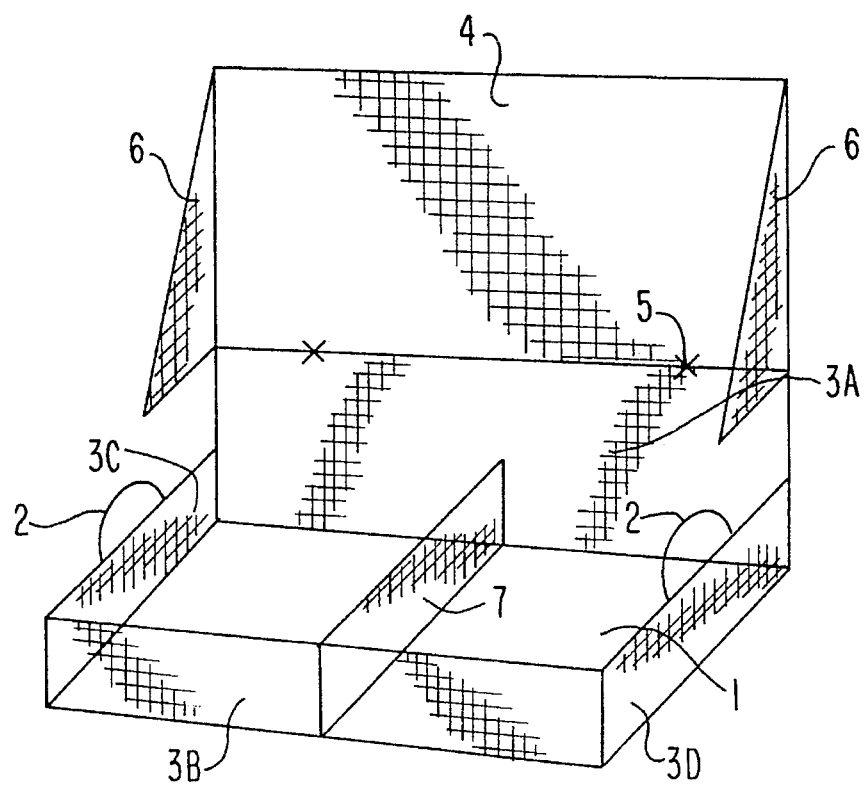
FIG. 2 shows another embodiment similar to that of FIG. 1 with a top in the open position and side handles.

As shown in FIG. 2, it is preferred to attach a lid 4 having two triangular overhang portions 6 by means of fasteners 5 to the raised side 3A. The fasteners may be any suitable fasteners that withstand the heat of cooking or grilling including alligator clips or metal rings. Also, FIG. 2 shows wire semicircular handles 2 attached to two of the sides 3C and 3D that adjoin the raised side 3A. FIG. 2 also shows a divider wall 7 placed inside the basket for separating different kinds of small food pieces.

Figure 3:
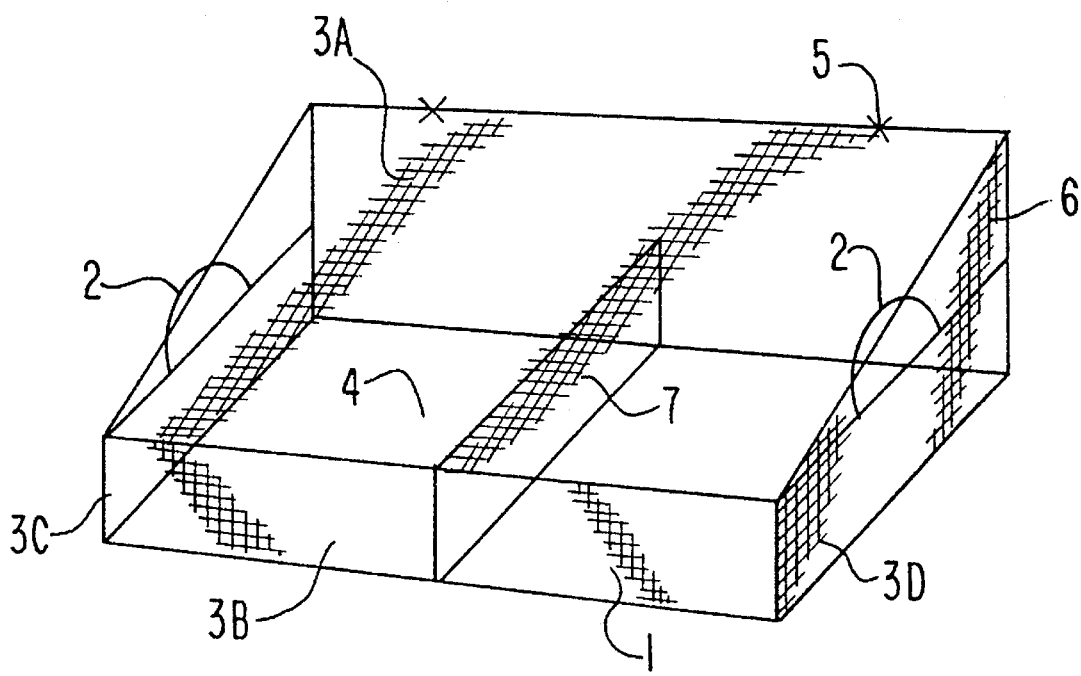
FIG. 3 shows the embodiment of FIG. 2 with the top in the closed position.
Figure 4:
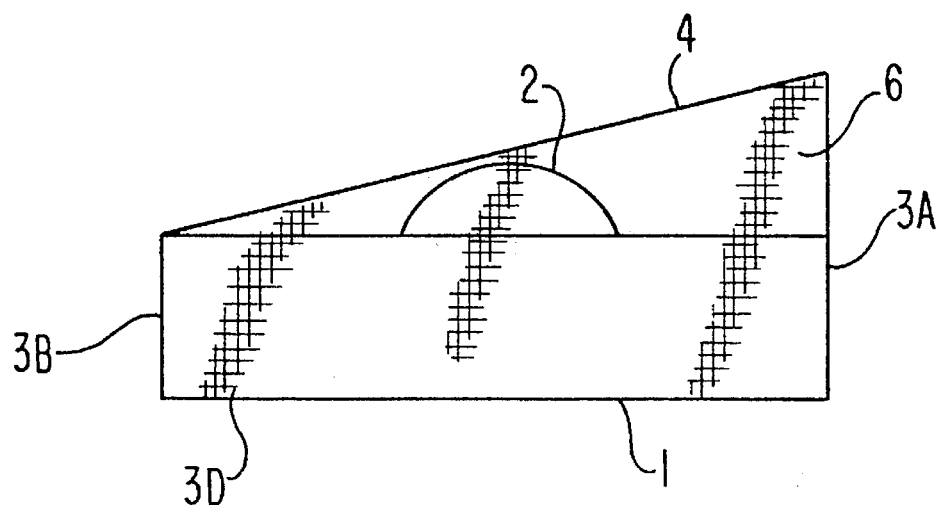
FIG. 4 shows a side view of the embodiment of FIG. 3.

FIG. 3 illustrates the embodiment of FIG. 2 wherein the lid 4 is in the closed position. Due to the raised edge 3A, the lid slopes downward when closed to meet the top edge of the lower front side 3B. This embodiment is advantageous because it fits inside most rectangular-shaped outdoor grills wherein the lid of the grill slopes downward toward the front of the grill.

The embodiments shown in FIGS. 1–4 can be manufactured from a single flat piece of mesh by making cuts in the piece of mesh according to desired dimensions and folding the sides of the cut pieces upward and joining the corners with fasteners or by welding or other suitable means for joining pieces of mesh together. For example, starting from a single piece of mesh, the lid 4 can be cut out and the overhang portions 6 can be folded downward. One or more divider walls 7 can be cut from the single starting piece of mesh and later attached into the interior of the basket. The basket is formed from the single piece of mesh by folding the pre-cut sides 3A, 3B, 3C, and 3D upward so that the edges of the sides meet each other. Thereafter, the adjoining edges may be fastened by suitable means for fastening pieces of mesh together such as closing rings, clips, solder or welding.

FIGS. 5–8 relate to another preferred embodiment of the present invention, which also can be manufactured from a single flat piece of mesh by making cuts in the piece of mesh according to desired dimensions and folding the sides of the cut piece upward and joining the corners with fasteners or by welding or other suitable means for joining pieces of mesh together as discussed more fully below.

Figure 5:
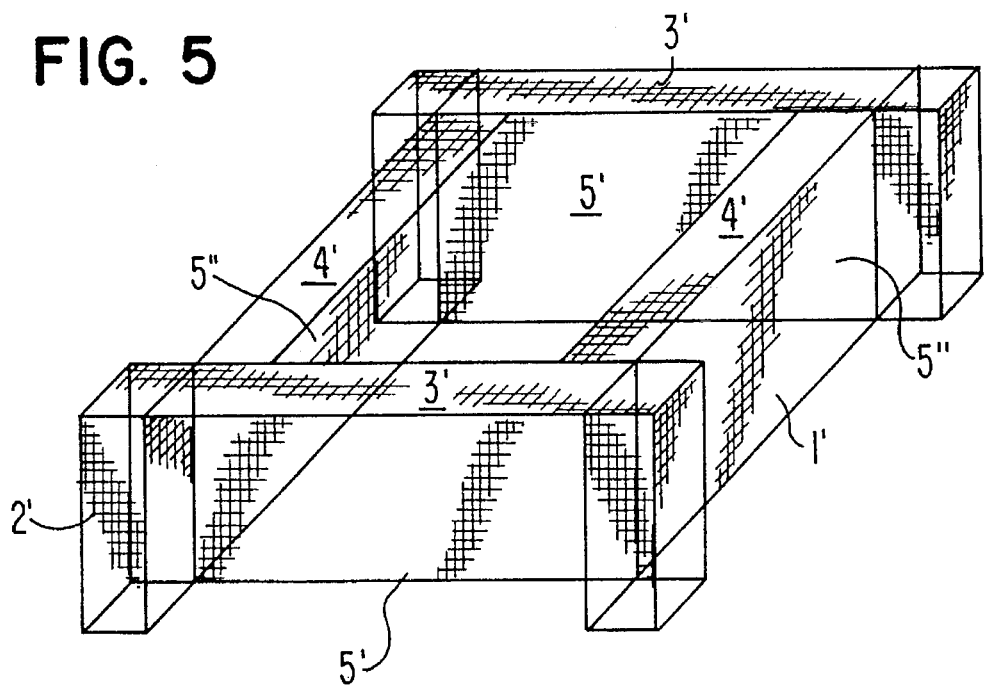
FIG. 5 is a top view of another embodiment with two inwardly facing top edges and two outwardly facing top edges and square grasping handles at each corner and hand spaces between the two corner handles.

In the preferred embodiment of FIG. 5, there is an interior rectangular cooking base 1', two outwardly facing top edges 3' adjoining two side walls 5', two inwardly facing top edges 4' adjoining the other two side walls 5", and four square grasping handles 2' at each corner of the base 1'. This embodiment is advantageous because the inwardly facing edges 4' help to retain the small pieces of food when the basket is moved while on the grill and or turned over onto its side, or removed from the cooking surface and shaken to the turn the food pieces over. The outwardly facing edges 3' provide handles for easy grasping of the basket during shaking, turning the device upside down with the lid on, and in removing the device from the grill.

Figure 6:
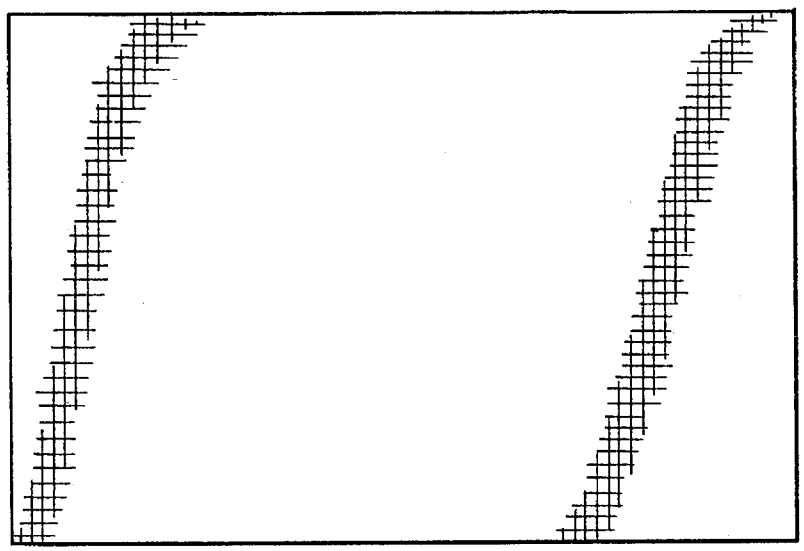
FIG. 6 is a top view of the lid for the embodiment of FIG. 5.

FIG. 6 shows the lid for the device of FIG. 5. The lid is a flat rectangular piece of mesh adapted to be placed on top of the opening in the device of FIG. 5. The lid can optionally be placed on top of the device and removed to permit stirring or moving of the contents within the basket. Also, the lid can be used for gathering contents in the basket by turning the device upside down while the lid is on or used for cooking by turning the device upside down so that the lid becomes the cooking base or independently removing the lid and using it as a second cooking base. The lid may be fastened at the top edge at one or more of the sides 5' so that it can be opened and closed.

Figure 7:
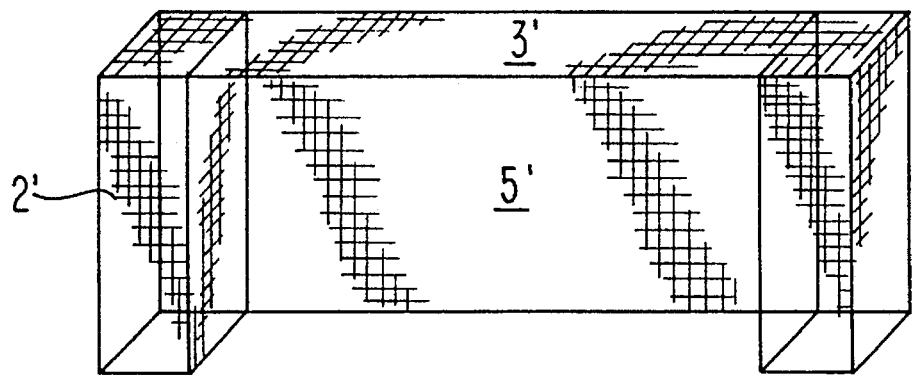
FIG. 7 is a frontal cut-away view of the embodiment of FIG. 5.

FIG. 7 shows the 5' side wall and corner handles 2' cut away from the rest of the device of FIG. 5. FIG. 7 illustrates how the outwardly facing edge 3' meets the two corner handles 2'.

Figure 8:
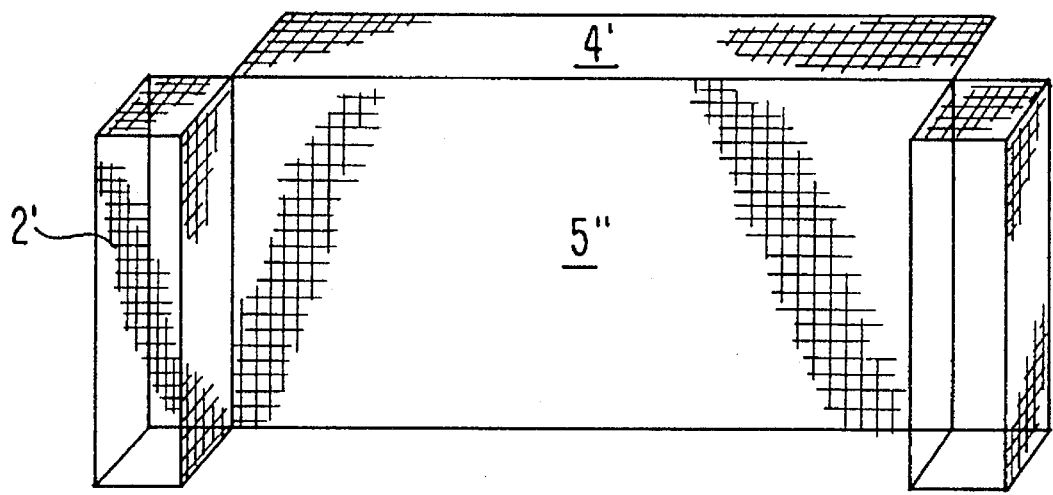
FIG. 8 is a side cut-away view of the embodiment of FIG. 5.

FIG. 8 shows the 5" side wall and corner handles cut away from the rest of the device of FIG. 5. FIG. 8 illustrates how the inwardly facing edge 4' faces away from the corner handles 2' toward the inside of the basket.

Figure 9:
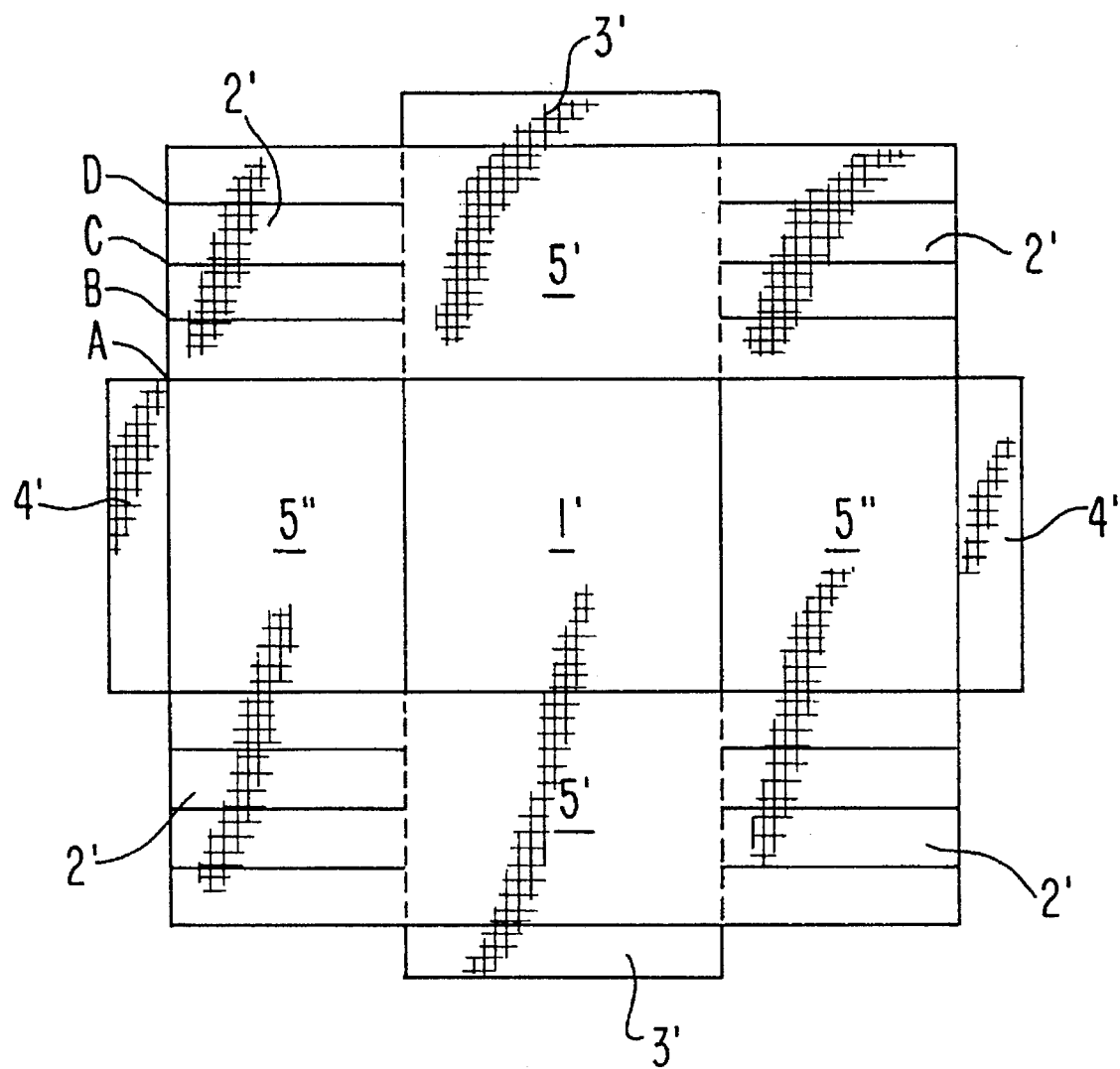
FIG. 9 shows the device of FIGS. 5–8 prior to folding.

FIG. 9 shows the device of FIG. 5 prior to folding of a piece of the mesh. The four dashed lines indicate the four places where the flat piece of mesh is internally pre-cut. All internal solid lines indicate the lines along which a fold must be made. First, the two 5' side walls which include the two outwardly facing 3' edges are folded up. Second, the other two 5" side walls which include the two inwardly facing 4' edges and the corner post portions 2' are folded up forming a basket. The inwardly facing 4' edges are folded to the inside of the basket. The outwardly facing 3' edges are folded to the outside of the basket. Lastly, the corner posts are formed by folding first at line A away from the basket, then at line B in a direction parallel to the adjoining side wall 5", then at line C and finally at line D. In this way, the four corners of the corner post 2' are made.

Figure 10:
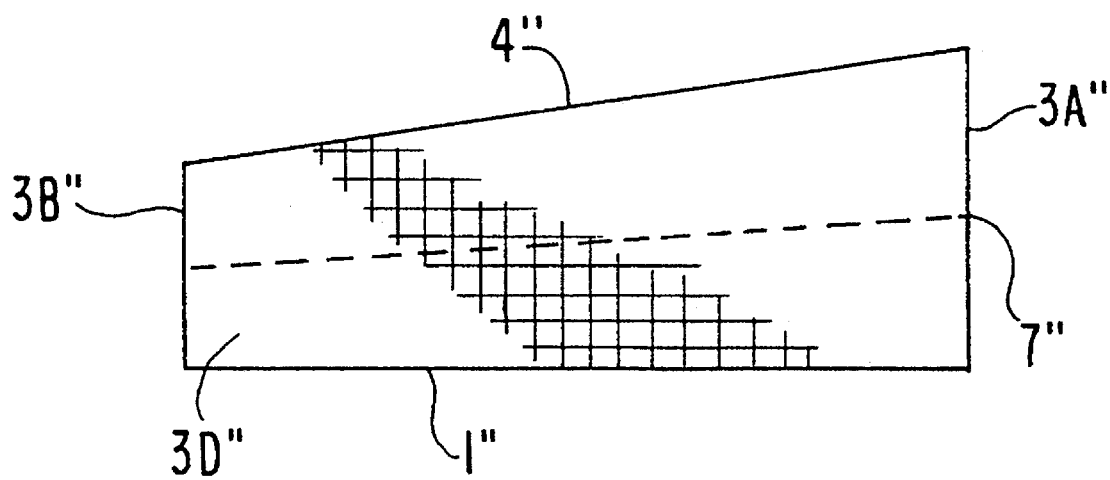
FIG. 10 shows a side view of another embodiment of the device according to the present invention comprising two halves.

FIG. 10 shows a side view of a preferred embodiment of the present invention. The device comprises a raised rear wall 3A" and a lower front wall 3B". Side wall 3D" is sloped to meet the angle of the top 4". The four side walls are joined to each other and joined to the top 4" and the bottom 1". A single cut, shown in the Figure as the dashed line 7", is made through the four side walls, separating the device into two halves, i.e., a top and a bottom half. The top and bottom halves may be used together as one grilling device or the top can be removed and turned upside down for use as a separate grilling device.

It will be understood that various modifications in the invention as described herein may be made without departing from the spirit of the invention and from the scope of the claims which follow.

What is claimed is:

1. A device for cooking or grilling small pieces of food comprising two halves of a basket which fit together to form a fully enclosed basket, each half including a mesh made of a material suitable for cooking or grilling small pieces of food having openings throughout the mesh, said mesh comprising a bottom, a rear wall, a front wall, and two side walls, wherein the two side walls are joined to the front and rear walls and the rear wall is higher than the front wall such that the entire device fits completely within conventional covered outdoor barbecue grills and such that the higher rear wall facilitates turning over the small pieces of food when the device is shaken.

2. The device as claimed in claim 1 wherein the top and bottom are rectangular.

3. The device as claimed in claim 2 wherein the mesh is stainless steel mesh having square openings that measure between about 0.2 and about 0.8 inches across.

4. The device as claimed in claim 3 wherein the mesh is covered with a non-stick coating suitable for cooking or grilling small pieces of food.

5. The device as claimed in claim 4 wherein the mesh is coated with a material selected from the group consisting of nickel and porcelain.

6. The device as claimed in claim 2 further comprising two semi-circular wire handles attached to the side walls for grasping of the device.

7. The device as claimed in claim 1 further comprising one or more divider walls attached to the bottom of the basket which separate different kinds of small food pieces.

8. A method of grilling small pieces of food on a grill having a lid with the device as claimed in claim 1 comprising placing the pieces of food in the basket, placing the basket on a grill with a lid, closing the lid of the grill to completely enclose the device within, cooking the small pieces of food for a time sufficient to cook one side of the small pieces of food, opening the lid of the grill, shaking the basket of the device to turn the pieces of food over after one side of the pieces of food has been cooked, and removing the device from the grill when the small pieces of food are cooked.

9. The method as claimed in claim 8 wherein the top and bottom of the basket are rectangular.

10. The method as claimed in claim 8 wherein the mesh of the device is stainless steel mesh having square openings that measure between about 0.2 and about 0.8 inches across.

11. The method as claimed in claim 8 wherein the mesh is covered with a non-stick coating suitable for cooking or grilling small pieces of food.

12. The method as claimed in claim 8 wherein the mesh is coated with a material selected from the group consisting of nickel and porcelain.

13. The method as claimed in claim 8 wherein the device further comprises two semi-circular wire handles attached to the side walls for grasping of the device.

14. The method as claimed in claim 8 wherein the device further comprises one or more divider walls attached to the bottom of the basket which separate different kinds of small food items.

15. The method as claimed in claim 8 wherein the top half is used independently as a second grilling or cooking surface.

* * * * *